United States Patent
Chang

(10) Patent No.: US 6,594,741 B1
(45) Date of Patent: Jul. 15, 2003

(54) VERSATILE WRITE BUFFER FOR A MICROPROCESSOR AND METHOD USING SAME

(75) Inventor: Paul K. Chang, Sunnyvale, CA (US)

(73) Assignee: LSI Logic Corporation, Milpitas, CA (US)

(*) Notice: Subject to any disclaimer, the term of this patent is extended or adjusted under 35 U.S.C. 154(b) by 192 days.

(21) Appl. No.: 09/792,100

(22) Filed: Feb. 23, 2001

(51) Int. Cl.[7] .................................................. G06F 12/00
(52) U.S. Cl. ........................ 711/156; 711/141; 714/30; 714/45
(58) Field of Search ................................ 711/141–143; 714/30, 45

(56) References Cited

U.S. PATENT DOCUMENTS 5,404,480 A * 4/1995 Suzuki ........................ 711/117
6,134,634 A * 10/2000 Marshall et al. ............ 711/143

\* cited by examiner

*Primary Examiner*—Matthew Kim
*Assistant Examiner*—Woo H. Choi
(74) *Attorney, Agent, or Firm*—Conley, Rose & Tayon

(57) ABSTRACT

A system and method are presented for a write buffer that combines capabilities and features implemented in separate, specialized buffers in prior art microprocessors. The write buffer receives data records from a CPU and subsequently transfers them to a memory bus. In addition to the data records themselves, each location in the buffer contains a complement of control bits, which determine the mode in which the associated record will be transferred to the memory bus. The use of these bits allows the buffer to perform memory transfers associated with a write-back data cache or an EJTAG test module, as well as more conventional transfers traditionally performed by a write buffer. The combination of these multiple capabilities in a single write buffer is believed to simplify the design of the bus interface unit in a microprocessor incorporating the principles disclosed herein.

16 Claims, 10 Drawing Sheets

VERSATILE WRITE BUFFER FOR A MICROPROCESSOR AND METHOD USING SAME

BACKGROUND OF THE INVENTION

1. Field of Invention

This invention relates to microprocessor architecture, more particularly, to the interface between a microprocessor and main memory.

2. Description of Related Art

The principal component in a modern computer is the microprocessor. It is the microprocessor, often executing hundreds of millions of instructions per second, which actually "runs" our applications. Computers are often evaluated on the basis of the speed of their microprocessor—for example, a machine with a 700 MHz processor is typically considered "better" than one with a 133 MHz processor. Yet, every microprocessor requires memory. The instructions executed by the microprocessor, as well as the data upon which it operates, are accessed from the memory. Thus, the overall performance of a computer depends on how efficiently the microprocessor utilizes memory, as well as the raw speed of its internal logic.

The microprocessor accesses the memory over a bus, which includes address and data lines. The address lines allow the microprocessor to designate a particular memory location to be read from or written to, and the data lines convey the data to or from the selected memory location. The microprocessor, typically operating at a higher speed, can sometimes be encumbered by the slower memory. For example, it may happen that the microprocessor is forced to postpone an instruction fetch because the memory is unavailable, due to a previous operation that has not completed. To deal with such situations, most microprocessors are capable of prolonging their normal instruction cycle through the insertion of "wait states." The wait states effectively slow down the microprocessor's read/write timing to accommodate the memory. However, a memory interface that depended heavily on wait states would effectively handicap the microprocessor.

Instead, various measures may be taken to improve the efficiency with which the microprocessor accesses memory. One approach involves the use of a write buffer. In general, a buffer is a data area shared by hardware devices or program processes that operate at different speeds or with different sets of priorities. The buffer allows one device or process to operate without being held up by another. A buffer is similar to a cache, but exists not so much to accelerate the speed of an activity as to support the coordination of separate activities, typically clocked at different speeds.

The central processing unit (CPU) in a microprocessor normally fetches (i.e., reads) instructions and data from memory and generates results to be written back to memory. Thus, memory access speed directly influences its speed of execution. However, read operations are typically more critical than writes in this regard. To maintain throughput, the CPU must fetch an instruction (and possibly an operand) from memory each instruction cycle. Results, on the other hand, need not be stored to memory immediately, but can be deferred until it is convenient (e.g., when the memory bus becomes available). Since a write buffer generally interfaces directly to the CPU, the CPU is able to write data into it without accessing the memory bus. Thus, the CPU can continuously fetch instructions and data from memory, and store results in the write buffer. The write buffer contents are independently dispatched to memory during times when the bus is not in use. A bus interface unit (BIU) within the microprocessor coordinates the shared use of the memory bus by the CPU and the write buffer. The BIU coordinates differences in operation between the CPU local bus and one or more buses external to the CPU (i.e., the memory bus). In these circumstances, it is often possible to advantageously increase CPU throughput by using a write buffer within the BIU between the CPU and memory.

A modern microprocessor may interact with memory in a number of ways. For example, a processor equipped with an instruction pipeline often includes the capability to defer load/store operations associated with a current instruction in the pipeline until similar operations associated with previous instructions have completed. Also, many microprocessors today incorporate diagnostic logic (e.g., JTAG-based scan networks), which may require access to the memory while performing test functions.

Diagnostic circuitry based on the joint test action group (JTAG) standard is now included in many microprocessors. The JTAG standard arose in response to the increasing difficulty in testing complex, high-speed integrated circuits by means of conventional external test instruments. Clock rates for many microprocessors, for example, now approach microwave frequencies. It is difficult, if not impossible, to convey diagnostic information to an external tester at the full operating speed of such devices. In addition, pin spacing on device packages has become so dense that traditional techniques for probing external signals are no longer practical. The JTAG standard provides for the inclusion of diagnostic hardware within integrated circuits, along with the functional circuitry. On-chip diagnostic circuitry, coupled with JTAG-compliant scan registers, makes it possible to load a test vector into the IC, run a test, and then scan out internal device states.

To support these various modes of interaction, the bus interface unit of the microprocessor may be compounded by multiple special-purpose write buffers and considerable additional logic, dedicated to the specific functions. Unfortunately, this adds to the complexity and manufacturing cost of the microprocessor. Therefore, it would be desirable to have a single write buffer that will support multiple types of processor-memory transactions.

SUMMARY OF THE INVENTION

The problems outlined above are addressed by a single write buffer that combines capabilities and features implemented in separate, specialized buffers of prior art microprocessors. In addition to storing the buffered data and its address, a set of control bits is associated with each storage location, by means of which the improved write buffer hereof directs the transfer of data to memory. The control bits can be used to modify the operation of the write buffer, allowing it to support a variety of memory access modes.

In an embodiment, the buffer is coupled to a central processing unit (CPU) and a memory bus. The buffer contains storage locations, into which data records received from the CPU may be stored, and from which these data records may be transferred to the memory bus. As used herein, the term "data record" refers to a discrete plurality of bits, indicative of data to be transferred to memory from a processor, direct memory access (DMA), peripheral device, etc. Associated with each location in the buffer is a set of control bits, which determine the mode in which the data record stored at that location will be transferred to the memory bus.

The storage locations are addressable by an input pointer and an output pointer. The input pointer indicates the storage location into which the next data record received from the CPU will be stored. As each new data record is received from the CPU and stored in the buffer, the input pointer advances to the next location. Similarly, the output pointer indicates the storage location from which the next data record transferred to the memory bus will be taken. As each data record is transferred from the buffer to the memory bus, the output pointer advances to the next location.

In an exemplary embodiment, the control bits associated with each location in the buffer include a valid bit, a sync bit, an EJTAG Bit, and store conditional and store conditional pass bits. The valid bit indicates that the respective location in the buffer contains data to be transferred to the memory bus. Thus, the contents of a given location in the write buffer will be transferred to the memory bus when the output pointer reaches that location only if the corresponding valid bit is set. The sync bit is used in conjunction with a SYNC instruction, to insure that any memory accesses initiated prior to the SYNC instruction are completed before memory accesses associated with subsequent instructions are allowed to begin. This is accomplished by forcing the CPU to delay any pending load operations until every entry in the write buffer for which the sync bit is active has been transferred to the memory bus. The EJTAG bit signifies that the corresponding data record in the write buffer has been received from the EJTAG test module, rather than from the CPU. In this case, the bus interface unit (BIU) may activate special control input/output (I/O) signals when the record is transferred to the memory bus. The store conditional bit is used together with the store conditional pass bit to make the transfer of a record from the buffer to the memory bus contingent upon an external event or signal. This may be useful, for example, for coordinating memory access between multiple processors. If the store conditional pass bit for a given buffer location is not set, the corresponding data record is not transferred to the memory bus. Moreover, the store conditional pass bit can be set or cleared at any point after the data record has been placed in the buffer. Consequently, an external event or signal that controls the store conditional pass bit can serve as a qualifier for the transfer of the data record to the memory bus.

The write buffer disclosed herein also supports the use of a write-back data cache. In this context, the write buffer receives data records from the CPU as they are written to a data cache. In this mode, the buffer does not individually transfer the records to the memory bus, but waits until an entire cache line (in an embodiment, a cache line contains four words) has been received. It then transfers all four words to the memory bus in burst fashion.

Also disclosed herein, a method is presented for storing data records received from a CPU and subsequently transferring them to a memory bus. According to the method, each record is stored in a FIFO buffer at a location indicated by an input pointer. The input pointer indicates the storage location into which the next data record will be stored, and is incremented each time another record is received. Associated with each buffer location is a set of control bits, which determine the mode in which the record at the respective location is transferred to the memory bus. An output pointer indicates the location of the next data record to be transferred to the memory bus, and is incremented each time another record is transferred. In the disclosed method, the control bits serve the same functions as described above.

Also disclosed herein is a microprocessor, comprising a CPU, memory bus and a write buffer. The buffer receives data records from the CPU and subsequently transfers them to the memory bus. In an embodiment, the buffer contains several locations, into which the data records are stored and from which they are transferred to the memory bus. An input pointer indicates the location into which the next record will be stored, and is incremented after each record is received. Similarly, an output pointer indicates the location from which the next record will be transferred to the memory bus, and is incremented after each record is transferred. In the microprocessor disclosed herein, the control bits serve the same functions as described above.

BRIEF DESCRIPTION OF THE DRAWINGS

Other objects and advantages of the invention will become apparent upon reading the following detailed description and upon reference to the accompanying drawings in which.

Figure 1:
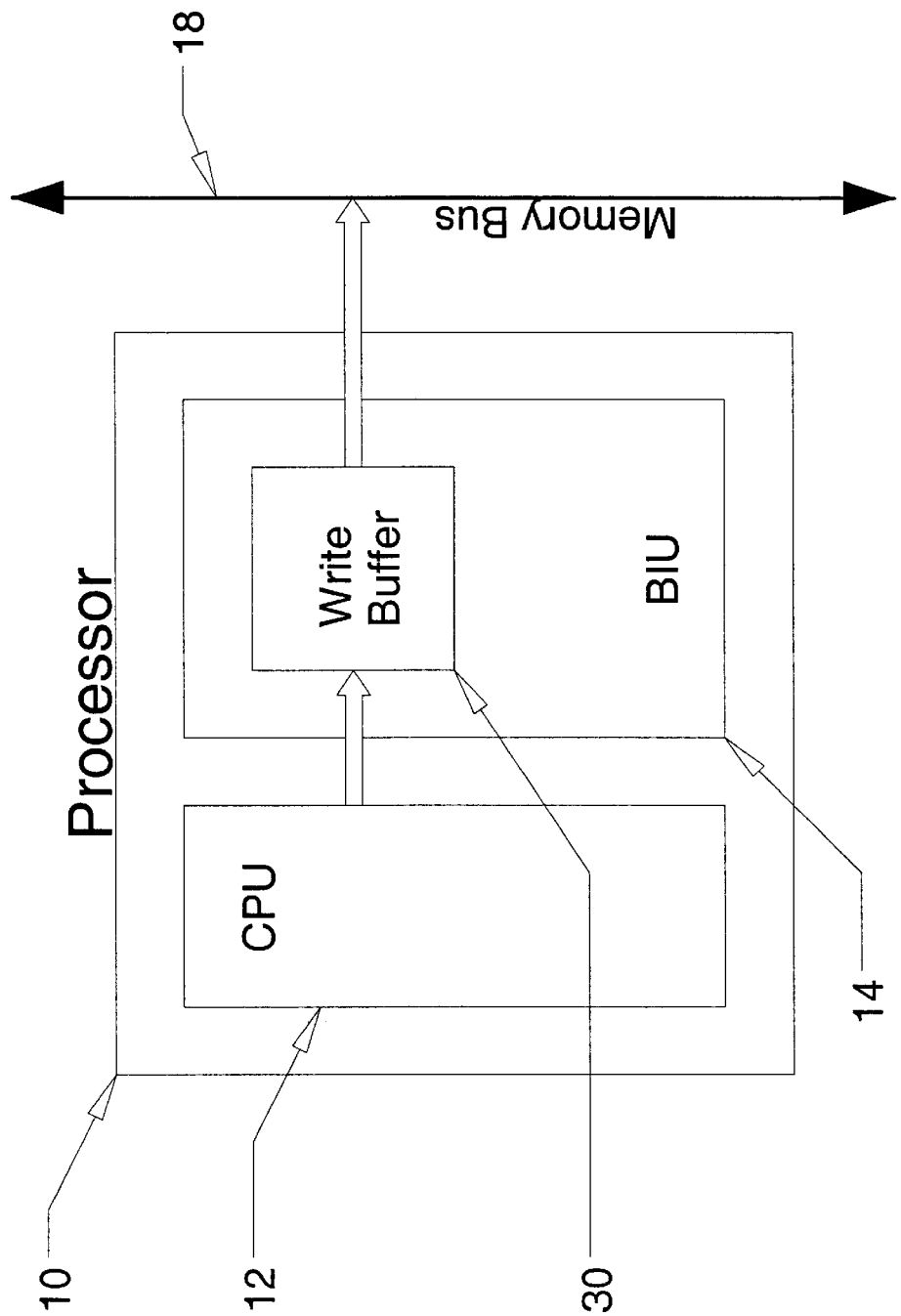
FIG. 1 illustrates the organization of an exemplary microprocessor, and the relationship of the write buffer to the CPU and bus interface unit (BIU)

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The execution speed of a microprocessor is related to how efficiently it uses its main memory. A typical microprocessor loads instructions and operands from memory, and stores the results of executed instructions back to memory. However, there is a disparity in the timing constraints between load and store memory accesses. Consider that, to fully utilize its central processing unit (CPU), the microprocessor must load a new instruction every instruction cycle. On the other hand, storing results is less critical. If the next instruction in a program sequence cannot be fetched from memory, the CPU becomes idle. In contrast, if the most recent result cannot be written to memory, CPU execution may still continue.

A write buffer exploits the disparity between load and store operations to enhance CPU performance. FIG. 1 represents a typical microprocessor 10, showing the relationship between the write buffer 30, the CPU 12 and the memory bus 18. Memory accesses are mediated by the bus interface unit (BIU) 14. For the reasons described above, logic within the BIU assigns different priorities to load and store memory accesses by the CPU. When CPU 12 needs to load an instruction or data from memory, the BIU 14 promptly grants it access to memory bus 18. However, when CPU 12 attempts to store a result in memory it may be delayed by the BIU, because some other operation with a higher priority has requested the bus 18. Therefore, instead of writing results directly to memory, the CPU 12 places them in the write buffer 30. Once a result has been placed in the write buffer 30, the CPU 12 is free to fetch next instruction and/or data from memory, without having to wait for the BIU 14. Under the control of the BIU 14, the write buffer 30 holds the results until the memory bus 18 becomes available, and then stores the results in memory.

Figure 2A:
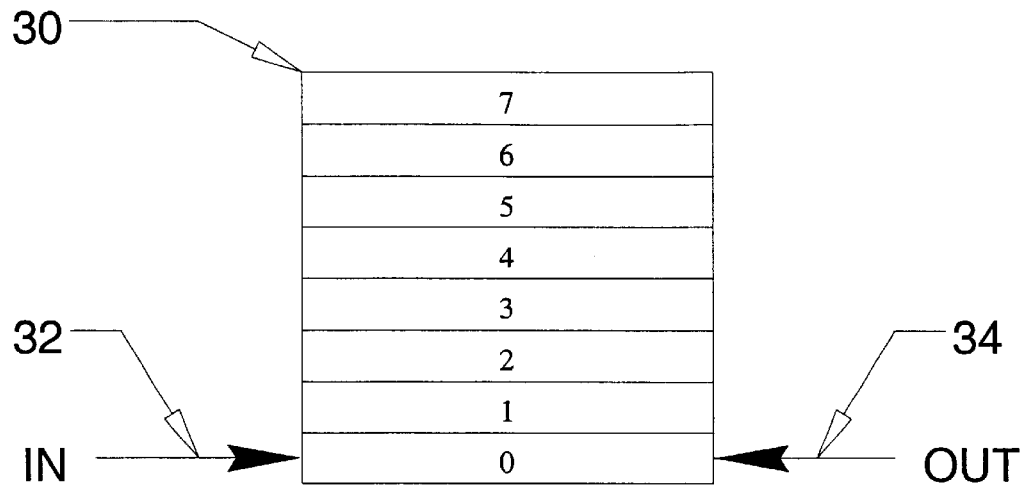
FIGS. 2a and 2b illustrate the operation of an exemplary FIFO buffer.
Figure 2B:
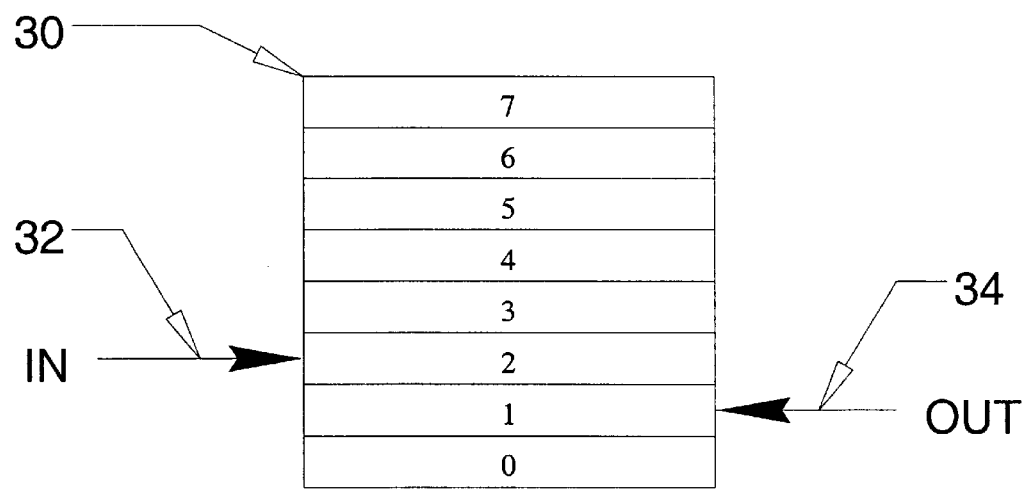

According to the system and method disclosed herein, a write buffer is a type of first-in, first-out (FIFO) buffer. A structural diagram of this type of buffer is shown in FIGS. 2a and 2b. Note that in subsequent drawings, recurring elements are identified with the same item number (e.g., item 30 is always used to indicate the write buffer). In this embodiment, the FIFO 30 contains 8 locations (0, 1, . . . , 7). Input 32 and output 34 address pointers are used to record the position in the FIFO of the next data record to be written into or read from the FIFO. A typical initial state of the FIFO is shown in FIG. 2a, in which both the input 32 and output 34 pointers are at location 0. FIG. 2b depicts the state of the FIFO after 2 data records have been written into the FIFO and 1 data record has been read out. Note that the input pointer 32 has advanced to location 2, since the next data record received from the CPU will be placed in location 2. Similarly, the output pointer 34 has moved to location 1, since data at location 1 will be the next to go out onto the memory bus (item 18 in FIG. 1). FIFO buffers are typically circular—i.e., when either pointer is incremented beyond the top of the buffer (location 7), it simply wraps around to the bottom (location 0) again. This is equivalent to saying that the FIFO addresses are modulo 8.

Figure 3:
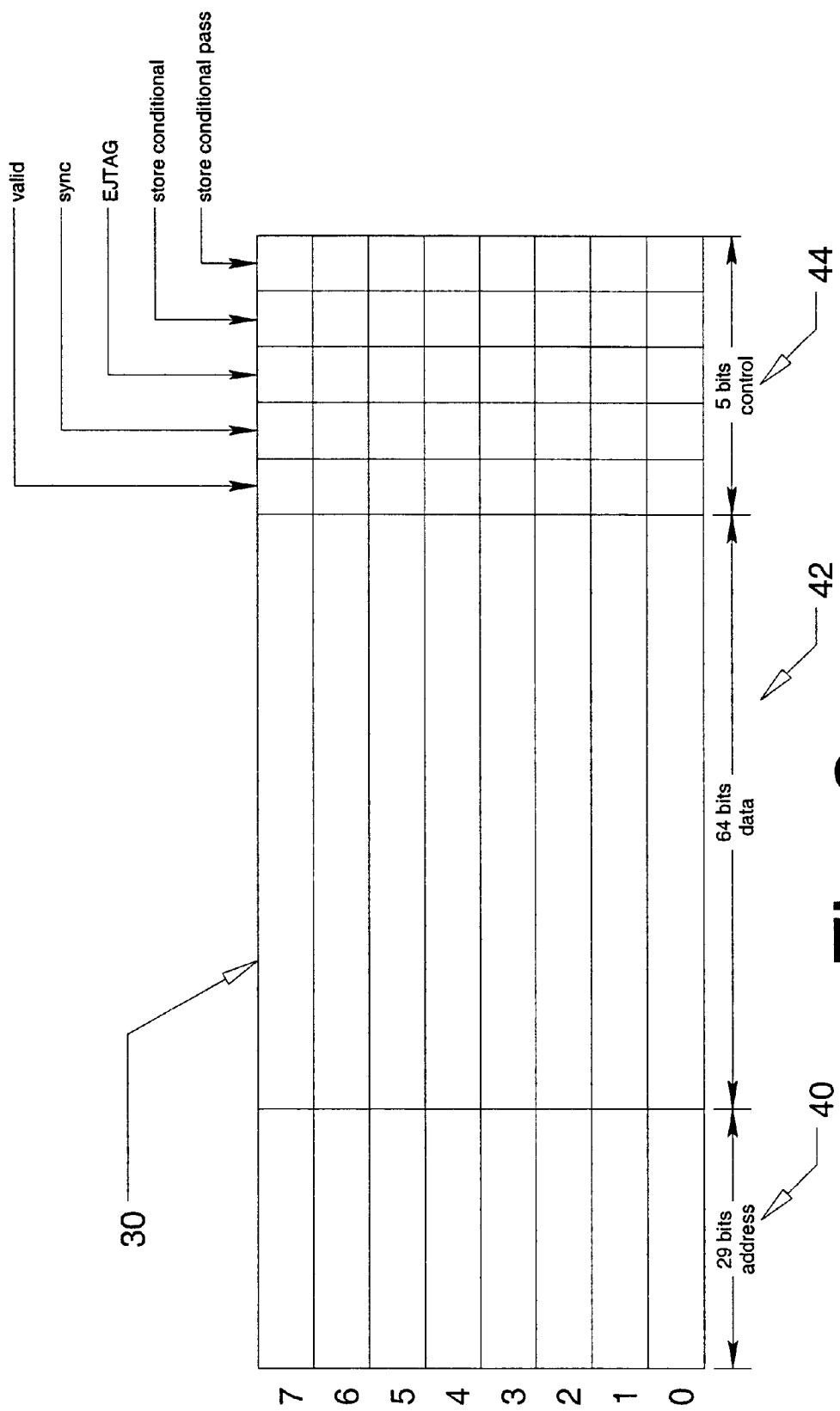
FIG. 3 shows the internal data format of an exemplary embodiment of the write buffer disclosed herein.

A write buffer embodying the system and method disclosed herein is represented in FIG. 3. The write buffer is implemented as a FIFO 30 with 8 locations (the input and output pointers are not shown). In this embodiment, the microprocessor may be a MIPS RISC-based processor core. Each entry in the write buffer can be 98 bits wide, consisting of a 29-bit address field 40 and a 64-bit data field 42, along with the following five control bits 44: (i) valid; (ii) sync; (iii) EJTAG; (iv) store conditional; and (v) store conditional pass. The control bits 44 enable the write buffer to be used for several types of memory transfer supported by the microprocessor, as described in detail below. The contents of the 64-bit data field 42 will be saved to memory at an address determined by the 29-bit address field 40, under the control of the BIU.

Figure 4A:
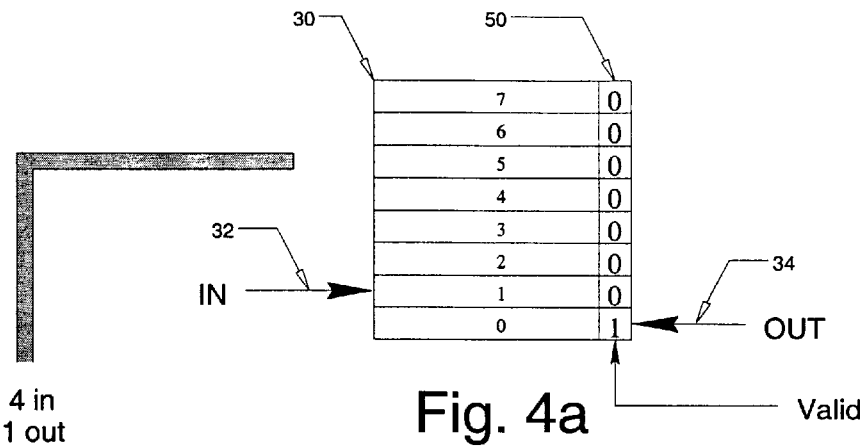
FIGS. 4a, 4b and 4c show the effect of the valid control bit on write buffer operation.
Figure 4B:
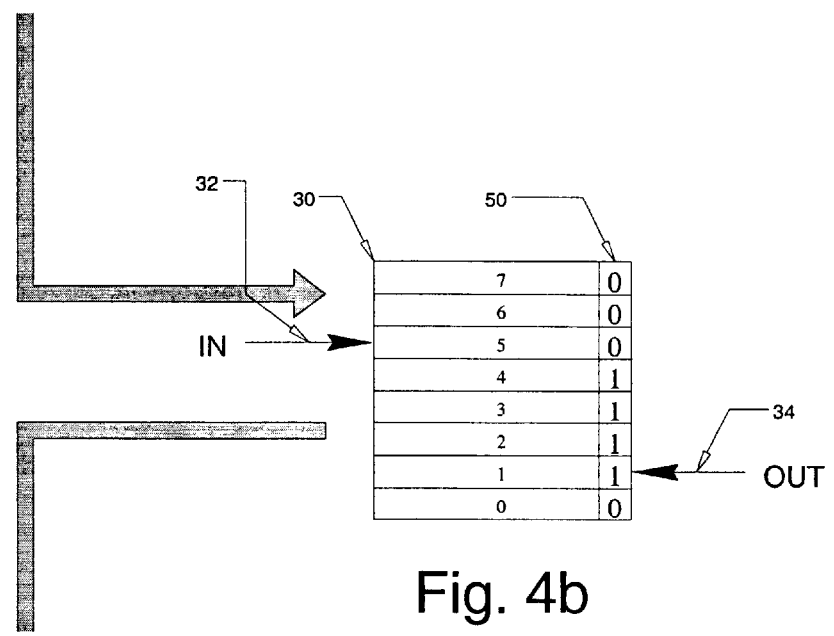
Figure 4C:
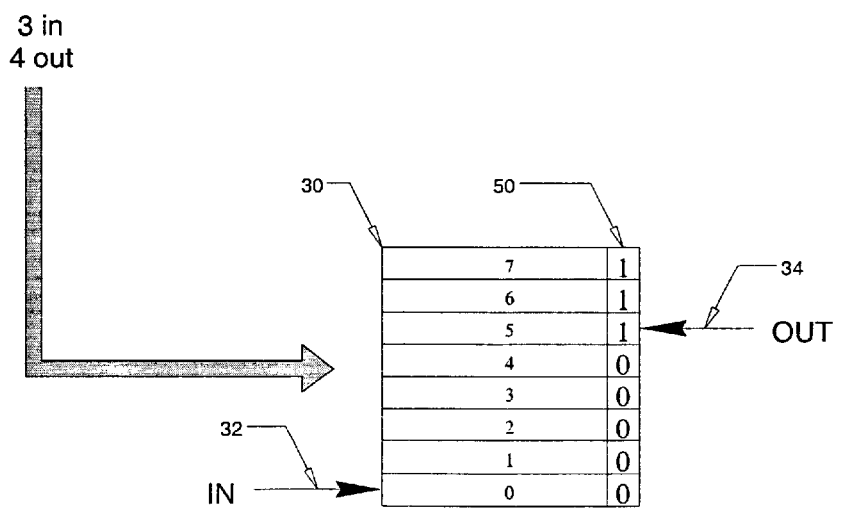

The use of the valid control bit is illustrated in FIGS. 4a–c. FIG. 4a shows the write buffer 30, along with the input 32 and output 34 pointers. Also shown is the valid bit 50 for each of the 8 write buffer locations. The valid bit is used to denote that a given data record in the write buffer is ready to be stored in memory. Initially, the write buffer is empty—therefore, the valid bit 50 for each location is 0. Thereafter, when a new entry is placed in the write buffer, its corresponding valid bit is set to 1; conversely, when the entry is read out of the write buffer (to be written to memory), the valid bit is reset to 0. In the example of FIG. 4a, a single data record has been placed into the write buffer at location 0. Consequently, the input pointer 32 is at location 1, and the valid bit for location 0 is set to 1. In FIG. 4b, four more data records have been placed in the write buffer. This advances the input pointer 32 to location 5, and causes the valid bits for locations 1–5 to be set to 1. Also, the data record placed in the write buffer at location 0 in the previous step has been read out. This advances the output pointer 34 to location 1, and causes the valid bit for location 0 to be reset to 0. In FIG. 4c, three more records have been placed in the write buffer, causing the input pointer 32 to wrap around to location 0 and causing the valid bit for locations 5–7 to be set to 1. At the same time, the four records placed in the buffer in the previous step have been read out, causing the output pointer 34 to advance to location 5, and causing the valid bit for locations 1–4 to be reset to 0.

Figure 5A:
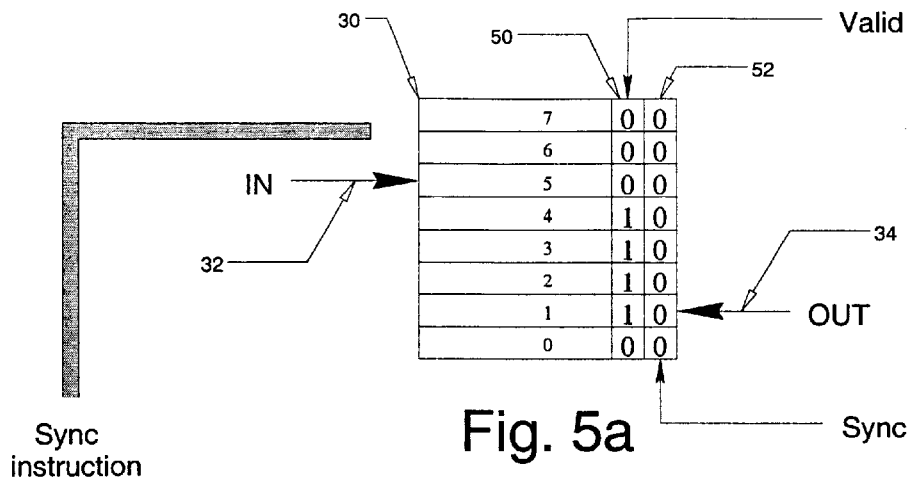
FIGS. 5a, 5b and 5c show the effect of the sync control bit on write buffer operation.
Figure 5B:
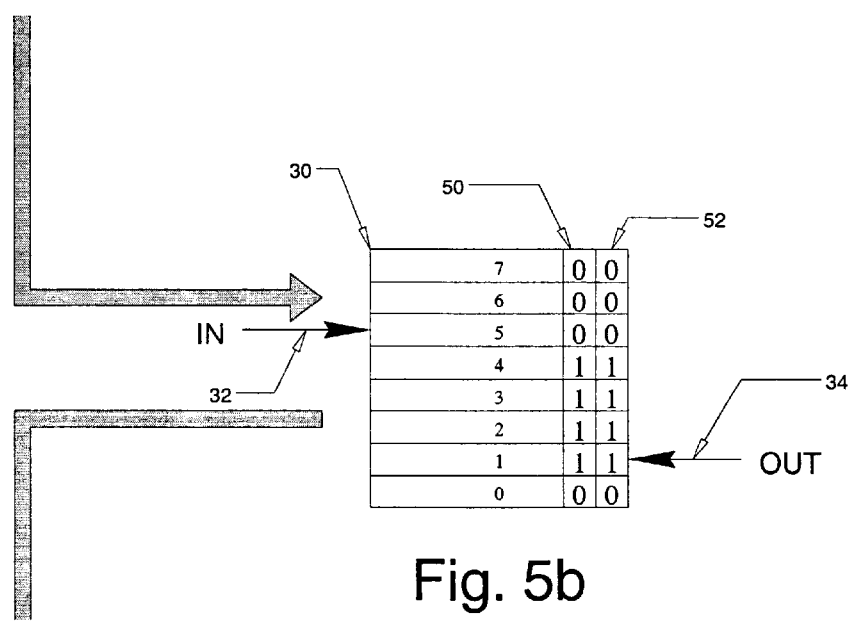
Figure 5C:
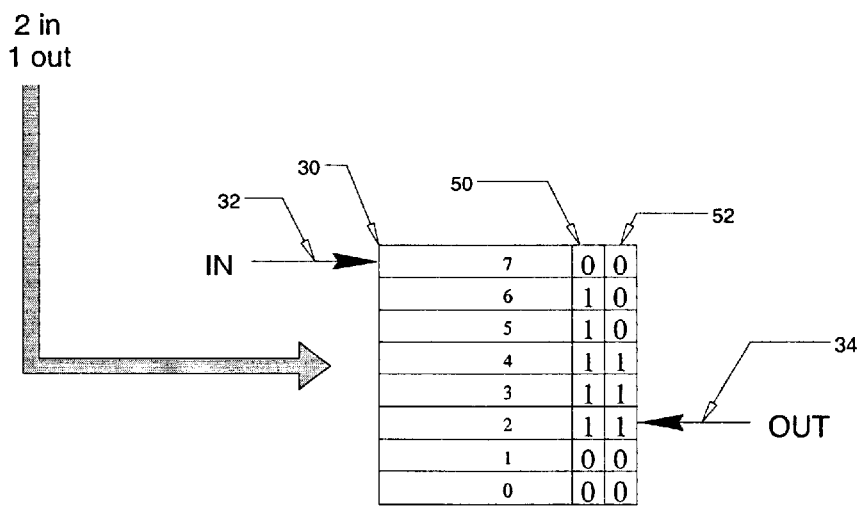

The sync bit is used in connection with a SYNC instruction, designed to guarantee that any load/store operations connected with previously fetched instructions are allowed to complete before any load/store operations fetched after the SYNC instruction are permitted to start. This instruction is useful for maintaining a strict memory access sequence among instructions that have shared data dependencies. The function of the sync bit in relation to the SYNC instruction is illustrated in FIGS. 5a–c. In FIG. 5a, four records have been placed in the write buffer and one (previously stored at location 0) has been read out. Consistent with this state of affairs, the input pointer 32 is at location 5 and the output pointer 34 is at location 1. Also note that the valid bit 50 for locations 1–4 is set to 1, while the valid bit for location 0 has been reset to 0, and that the sync bit 52 for all of the locations is 0. FIG. 5b represents the state of affairs after a SYNC instruction. The SYNC instruction does not place an entry into the write buffer, but causes the sync bit to be set to 1 for all valid entries in the buffer (i.e., for all entries whose valid bit is set to 1 at the time the SYNC instruction is issued). Note that the sync bit 52 for all of the locations containing valid data (i.e., locations 1–4) is set to 1. Following the SYNC instruction, the write buffer must expel every record for which the sync bit is set to 1 before the CPU is permitted to execute a load instruction. If the CPU encounters a load instruction while any of the sync bits is active, the instruction will be delayed until the corresponding records have been transferred from the write buffer to memory. In FIG. 5c, two more data records have been placed in the write buffer. Thus, the input pointer 32 has advanced to location 7, and the valid bits 50 for locations 5 and 6 have been set to 1. Also, one of the records placed in the buffer during the previous step has been read out. Thus, the output pointer 34 has advanced to location 2, and the valid bit 50 for location 1 has been reset to 0. Note that the sync bit 52 for location 1 has been reset to 0, since that record has been transferred to memory. Also note that the sync bits for locations 5 and 6 have not been set, since the data records at these locations were placed in the write buffer subsequent to the SYNC instruction.

An increasingly common feature in modern microprocessors is on-chip Joint Test Action Group (JTAG) test circuitry. The complexity and speed of current state-of-the-art processors is such that it may be difficult or impossible to thoroughly test them using external equipment. Therefore, it is often preferable to provide diagnostic circuitry within the device itself, which accepts test vectors and reports test results through an on-chip serial interface. Issued as IEEE Std. 1149.1 and 1149.1a, the JTAG standard was developed to allow standardized testing of an integrated circuit after it has been assembled onto a printed circuit board. Moreover, the JTAG standard provides for testing numerous integrated circuits on the board as well as the interconnection of those circuits to the printed conductors of the board. In-system testing is therefore provided for testing the entire, assembled printed circuit board using pins associated with a test access port ("TAP").

The JTAG standard calls for the inclusion of diagnostic circuitry within the core logic of the device under test. Among this diagnostic circuitry is a boundary scan register, which functions analogously to a parallel-in/parallel-out shift register. The scan register is capable of applying diagnostic bit patterns ("test vectors") to the inputs of the core logic, and capturing the resulting state of core logic outputs. This feature is quite useful for input/output characterization of many semiconductor devices.

Figure 6:
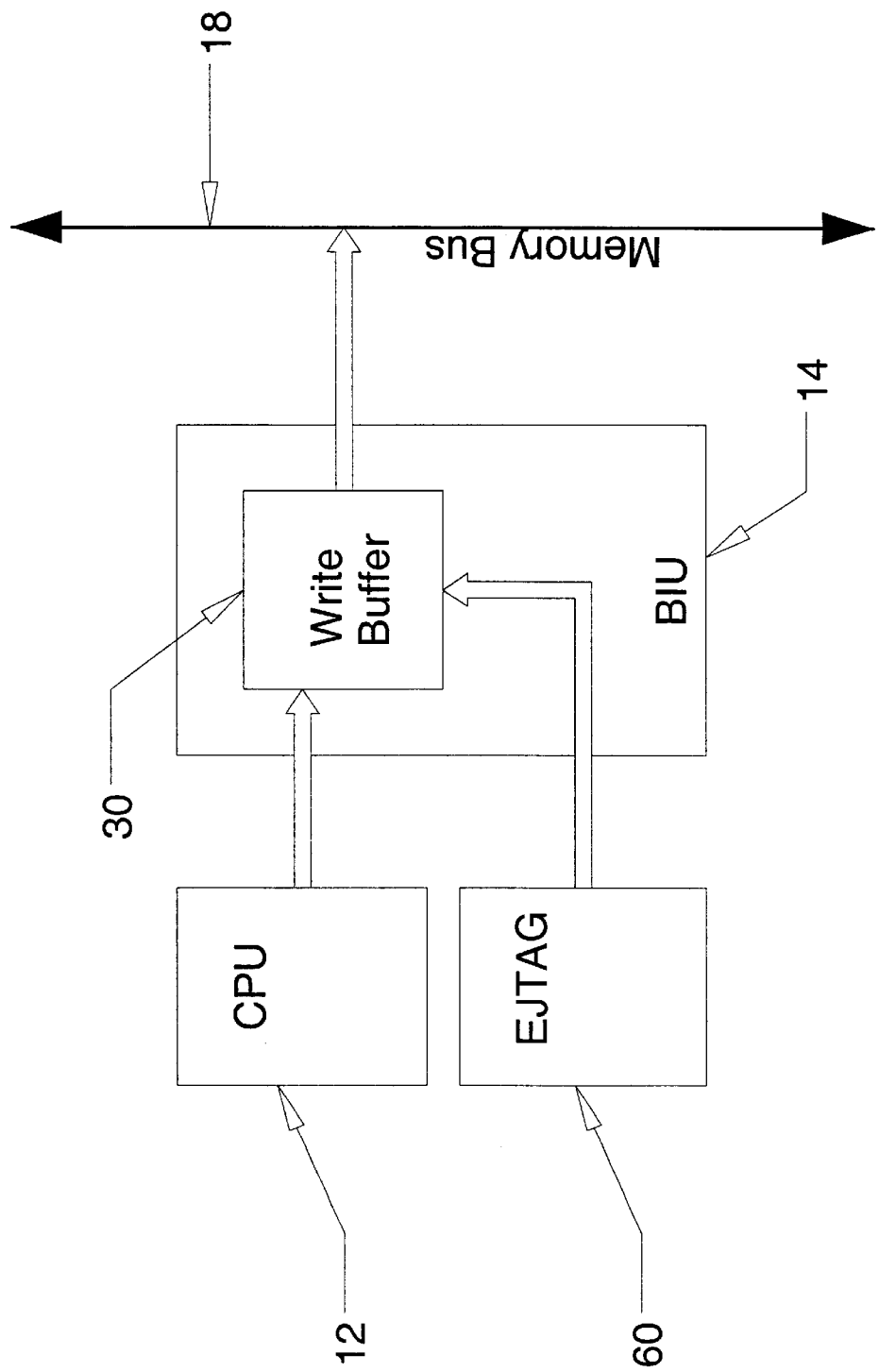
FIG. 6 represents the relationship between the CPU, the EJTAG unit and the write buffer.

The microprocessor of the present embodiment includes an enhanced JTAG (EJTAG) module for this purpose. As represented in FIG. 6, the EJTAG module 60 is tightly coupled to the BIU 14, and shares (with CPU 12) access to the write buffer 30. The EJTAG module 60 has read/write access to the memory, via the memory bus 18.

Figure 7:
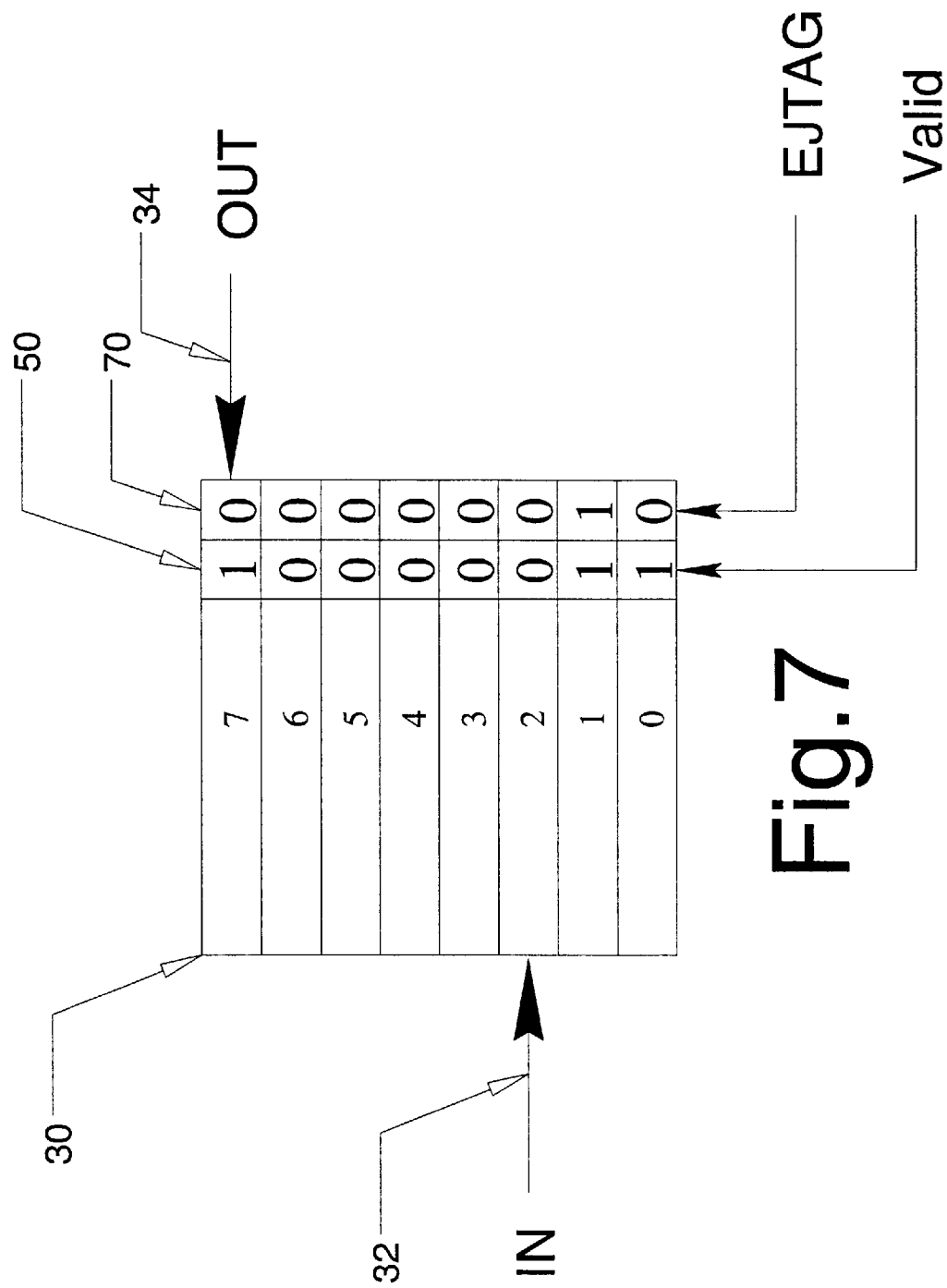
FIG. 7 illustrates the use of the control EJTAG bit.

FIG. 7 illustrates the use of the EJTAG control bit 70 in write buffer 30 to distinguish load and store operations initiated by the EJTAG module from those issued by the CPU. In FIG. 7, the write buffer 30 contains three valid entries, at locations 7, 0 and 1. The record at location 7 is the next to be read out of the buffer, as indicated by output pointer 34 and valid bit 50. Similarly, input pointer 32 indicates that the next data record to be placed in the write buffer will go in location 2. Note that the EJTAG bit 70 for location 1 is set to 1. This bit informs the BIU that the data record at location 1 was generated by the EJTAG module, rather than the CPU. When a data record with an active EJTAG control bit is read out of the write buffer, special control I/O signals related to self-test may be activated.

Figure 8A:
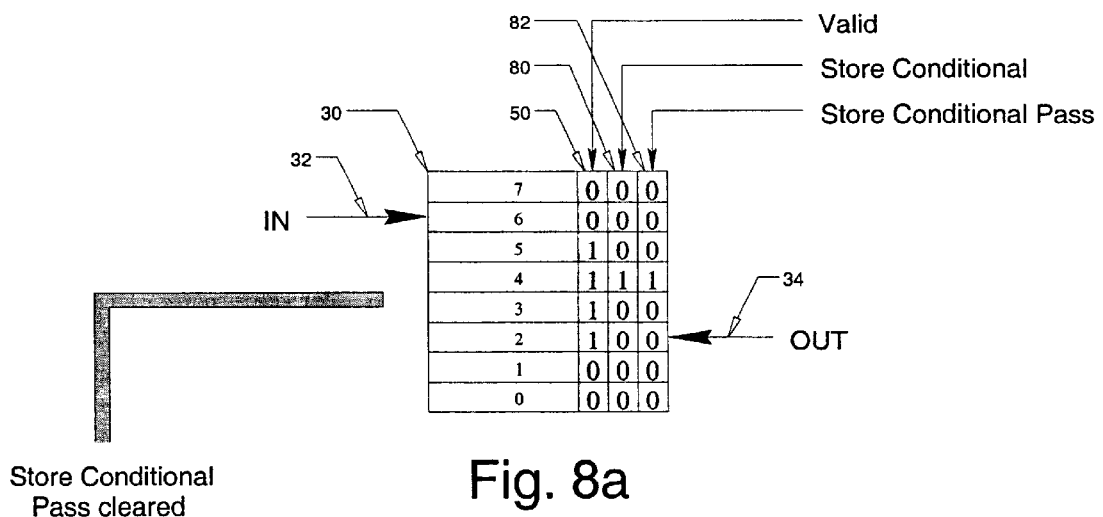
FIGS. 8a, 8b and 8c illustrate the effect of the store conditional and store conditional pass bits on write buffer operation.
Figure 8B:
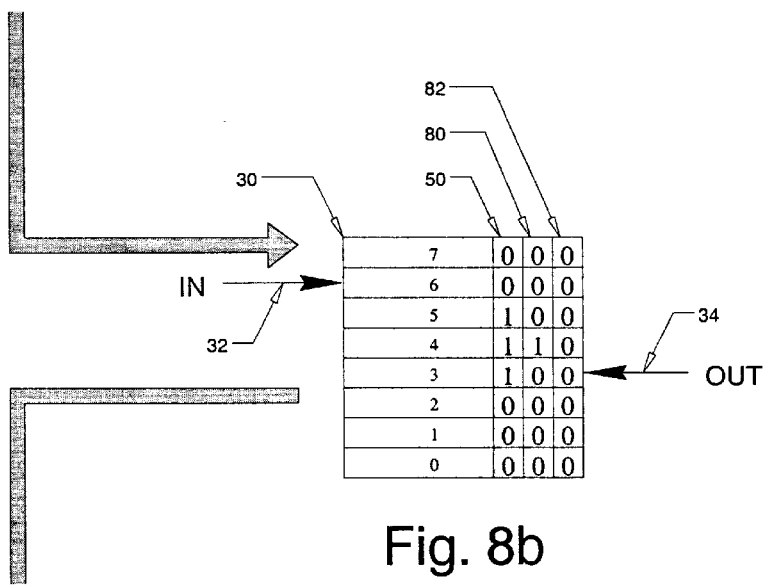
Figure 8C:
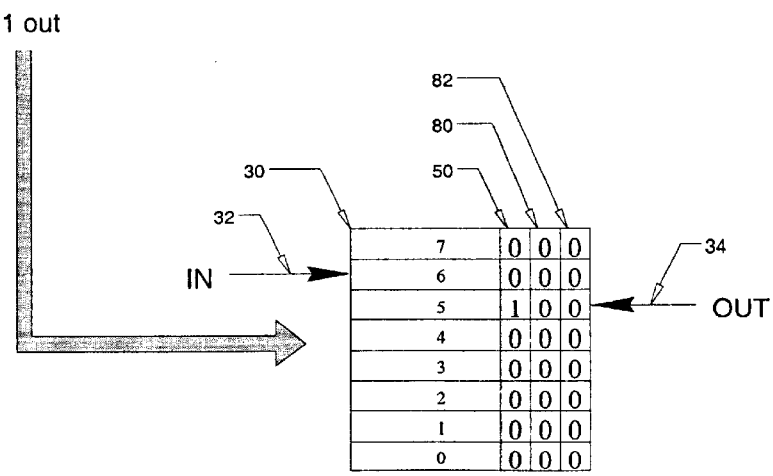

FIGS. 8a–c illustrate the use of control bits associated with a STORE CONDITIONAL instruction in the MIPS RISC-based processor core of the present embodiment. The STORE CONDITIONAL instruction places a data record into the write buffer and sets two associated control bits, store conditional 80 and store conditional pass 82. The store conditional bit flags the record as having been placed in the write buffer by a STORE CONDITIONAL instruction, and the store conditional pass bit indicates that the record should go out onto the memory bus. The store conditional pass bit may be cleared at any point prior to the record being read out of the buffer; if this happens, the record will be skipped by the output pointer 34 and will not go out onto the memory bus.

The store conditional and store conditional pass bits are useful in situations in which memory accesses must be synchronized to an external system—e.g., a second microprocessor within a multi-processor arrangement. It is often necessary in such applications to enforce data coherency among the interconnected processors—i.e., if multiple copies of data exist among the processors, older copies must be prevented from overwriting more recent copies. When a processor issues a STORE CONDITIONAL instruction, it enables the other interconnected processors to prevent the corresponding memory store operation, by giving them the opportunity to clear the store conditional pass control bit.

In FIG. 8a, four data records are waiting to be transferred from the write buffer 30 to memory. Thus, the valid bit is set to 1 for the records at locations 2–5. Input pointer 32 indicates that the next data record will be placed in the write buffer at location 6, while output pointer 34 indicates that the record at location 2 is the next to be read out of the buffer. Note, in addition, that store conditional and store conditional pass control bits for the record at location 4 are set to 1. Thus, that record was placed in the write buffer by a STORE CONDITIONAL instruction, and may be read out to memory when the output pointer 34 reaches location 4. FIG. 8b represents the situation after the record at location 2 has been read out of the write buffer and the store conditional pass control bit 82 has been cleared. In FIG. 8b, output pointer 34 has advanced to location 3, indicating the location of the next record to be read out of the write buffer. Normally, after the record at location 3 is read out, we would expect output pointer 34 to advance to location 4. However, since the store conditional bit 80 at location 4 is set, the BIU recognizes that this record was placed in the write buffer by a STORE CONDITIONAL instruction. In addition, since the store conditional pass bit 82 is cleared, the BIU bypasses this record and advances the output pointer 34 to location 5. This situation is depicted in FIG. 8c.

Virtually all modern microprocessors are equipped with some form of cache. A data cache is a special memory region (typically much smaller and with a much shorter access time than the main memory) into which frequently requested data are placed for faster access by the processor. The data cache may operate in either write-back or write-through modes. In write-through mode, the main memory is updated whenever the data in the cache changes. Thus, any time a data record is written to the cache, it is also copied to main memory. In write-back mode, data are copied to memory only when an entire cache line (typically four words) is replaced, either by cache maintenance instructions or by the cache replacement policy. The write buffer in this exemplary embodiment of the system and method disclosed herein supports a data cache operating in either write-back or write-through mode. The relationship between the write buffer and the data cache is illustrated in FIG. 9.

Figure 9:
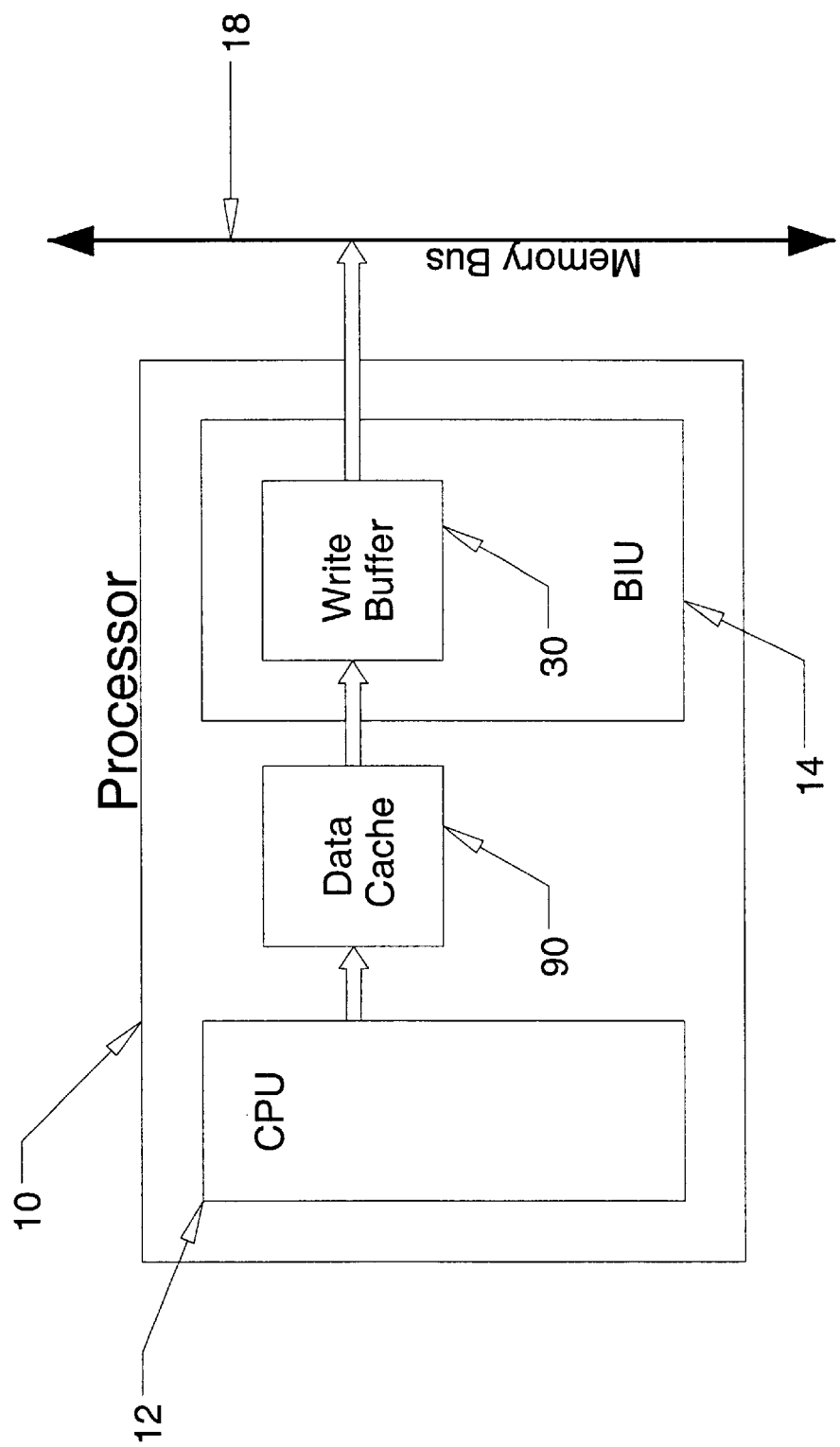
FIG. 9 illustrates the relationship between the CPU, Data Cache and an exemplary embodiment of the write buffer disclosed herein.

As shown in FIG. 9, when the CPU 12 writes data to the data cache 90 it is placed in the write buffer 30, which then (when the memory bus 18 is available) transfers it to main memory. If the data cache 90 is being used in write-through mode, each time the CPU 12 writes a data record to the cache, the record is also placed in the write buffer 30, which transfers it to main memory as soon as it receives access to the memory bus 18.

Figure 10A:
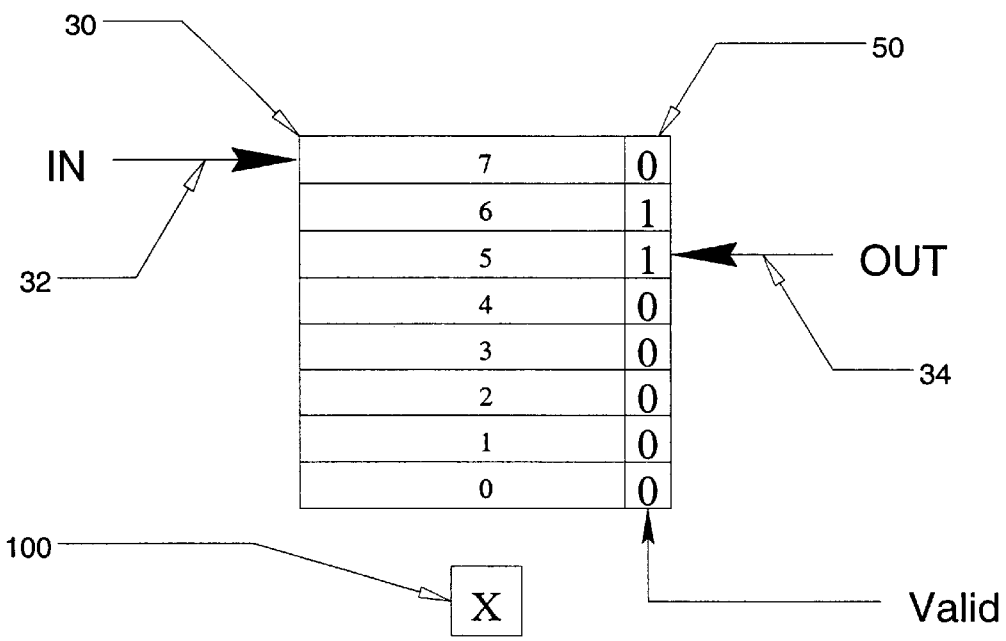
FIGS. 10a and 10b illustrate write-back operation of the write buffer in the embodiment of FIG. 9.
Figure 10B:
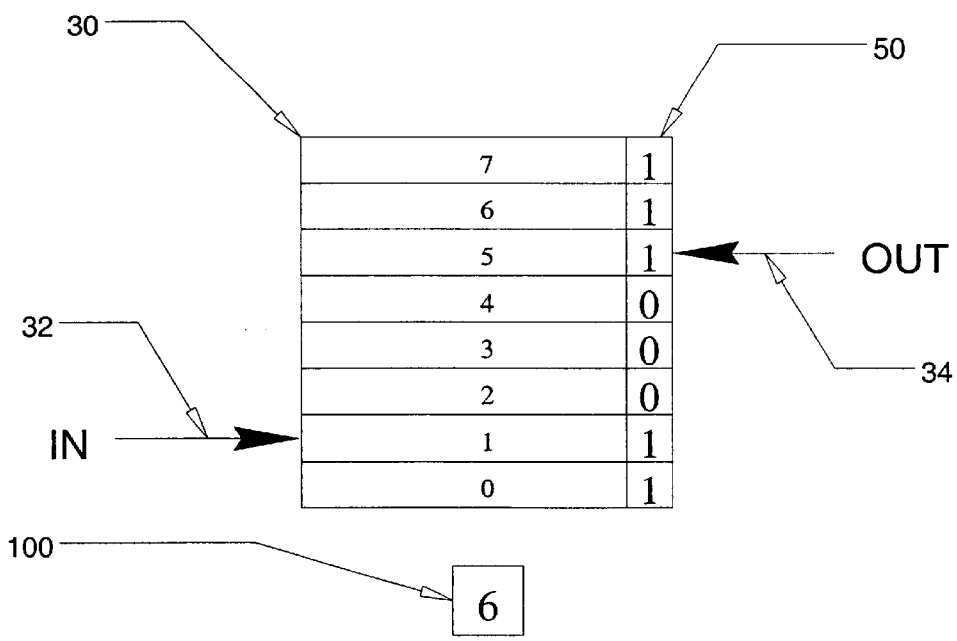

Write-back operation is slightly more complex, and is explained with reference to FIGS. 10a and 10b. As discussed above, data in the cache are not transferred to main memory until an entire cache line has been flushed by a cache maintenance instruction or by the cache replacement policy. Thus, the write buffer must wait until it has all four words of the cache line before transferring them to memory. In FIG. 10a the first word of a cache line has been placed in the write buffer 30 at location 6. The output pointer 34 indicates that location 5 contains the next data record to be transferred to memory. The BIU logic is aware that this data record is not part of a write-back cache, so cache line pointer 100 does not contain a valid write buffer location. In FIG. 10b four entries from one cache line have been placed in the write buffer at locations 6, 7, 0 and 1 (note that the input pointer 32 has wrapped around to the bottom of the FIFO for the last two entries), and cache line pointer 100 indicates that location 6 contains the first entry in a cache line. When the output pointer 34 advances to location 6, the BIU attempts to transfer the contents of locations 6, 7, 0 and 1 (i.e., the entire cache line) to memory in "burst mode" (as soon as the memory bus is available).

In the present embodiment, the write buffer includes a hardware enable/disable feature. When the write buffer is disabled, its size is scaled from 8 records to 1 (rendering it ineffective as a buffer). Note that if the CPU attempts to write a data record to the disabled write buffer before the buffer has transferred its previous contents to memory, the CPU will stall (i.e., it will be forced to generate wait states).

A number of advantages are believed to result from the system and method described herein. A single write buffer, based on this system and method, combines the capabilities of several specialized buffers to support features traditionally present in microprocessors, such as write-back data cache. In addition, the write buffer supports newer features, not common in previous generation microprocessors, such as the EJTAG module and the STORE CONDITIONAL and SYNC instructions. Furthermore, by combining these capabilities in a single write buffer, the BIU logic within the microprocessor is simplified. Incorporation of the write buffer into a microprocessor is believed to be straightforward.

It will be appreciated by those skilled in the art having the benefit of this disclosure that this invention is believed to present a system and method for implementing a write buffer with support for multiple memory access modes. Further modifications and alternative embodiments of various aspects of the invention will be apparent to those skilled in the art in view of this description. Details described herein, such as the length of the buffer and the number of control bits, are exemplary of a particular embodiment. It is intended that the following claims be interpreted to embrace all such modifications and changes and, accordingly, the specification and drawings are to be regarded in an illustrative rather than a restrictive sense.

What is claimed is:

1. A buffer, operably coupled to a central processing unit (CPU) and a memory bus, said buffer comprising:
    a plurality of storage locations configured to receive data records from the CPU and to transfer the data records to the memory bus;
    control bits, associated with each of the plurality of storage locations, which determine whether a data record stored at the respective location is transferred to the memory bus as a selective transfer, conditional transfer, burst transfer or data dependent transfer;
    wherein one of the control bits is a sync bit that prevents the CPU from executing a load instruction until the data record at the location associated with the control bit has been transferred to the memory bus; and
    wherein another one of the control bits is an EJTAG bit that enables transfer of data from an EJTAG module to the memory bus.

2. The buffer as recited in claim 1, further comprising a FIFO buffer employing an input pointer to indicate the location to which the next data record will be stored, and an output pointer indicating the location from which the next data record will be transferred to the memory bus.

3. The buffer as recited in claim 1, wherein the control bits further comprise a valid bit, such that if the valid bit for a particular location is active, then the data record stored at that location is permitted to be transferred to the memory bus.

4. The buffer as recited in claim 1, wherein the control bits further comprise a store conditional bit and a store conditional pass bit, such that if the store conditional bit associated with any buffer location is active, then the data record at that location will only be transferred to the memory bus if the corresponding store conditional pass bit is also active.

5. The buffer as recited in claim 1, wherein the data records received from the CPU are also stored in a cache, and the buffer receives an entire cache line from the CPU before transferring any of the data records contained in the cache line to the memory bus.

6. A method for storing data records from a CPU and subsequently transferring said records to a memory bus, the method comprising:
    storing each data record in a FIFO buffer at a location indicated by an input pointer, then incrementing the pointer to indicate the next location;
    configuring a set of control bits associated with each buffer location to which a data record has been stored wherein one control bit of the set of control bits determines whether the data record was sent from an EJTAG module rather than from the CPU; and
    in accordance with the control bits, transferring each data record from a location indicated by the output pointer to the memory bus, then incrementing the output pointer to indicate the next buffer location.

7. The method as recited in claim 6, wherein the control bits include a valid bit and the method further comprises setting the valid bit for a particular buffer location when a data record is stored at that location, and clearing the valid bit when the data record is transferred to the memory bus.

8. The method as recited in claim 6, wherein the control bits include a sync bit and the method further comprises setting the sync bit for a particular buffer location to prevent the CPU from executing a load instruction until the data record at that buffer location has been transferred to the memory bus.

9. The method as recited in claim 6, wherein the control bits include a store conditional bit and a store conditional pass bit, and the method further comprises setting the store conditional bit for a particular buffer location to prevent the data record at that location from being transferred to the memory bus unless the corresponding store conditional pass bit is also set.

10. The method as recited in claim 6, further comprising storing all the data records from a cache line in the buffer before transferring any of said data records to the memory bus.

11. A microprocessor, containing a central processing unit (CPU), a memory bus and a write buffer adapted to store data records received from the CPU and subsequently transfer them to the memory bus, wherein the write buffer comprises:
    a plurality of storage locations for data records received from the CPU;
    an input pointer, which indicates the storage location in which the next data record received from the CPU will be stored, and is incremented each time another data record is stored;
    an output pointer, which indicates the storage location from which the next data record will be transferred to the memory bus, and is incremented each time a data record is transferred; and
    a set of control bits associated with each storage location, wherein one control bit of the set of control bits determines the mode in which a data record stored at the respective location is transferred to the memory bus from an EJTAG module rather than from the CPU.

12. The microprocessor as recited in claim 11, wherein the control bits include a valid bit, such that the valid bit for a particular location is set when a data record is stored at that location, and cleared when the data record is transferred to the memory bus.

13. The microprocessor as recited in claim 11, wherein the control bits include a sync bit, such that if the sync bit associated with any write buffer location is active, then the CPU may not execute a load instruction until the data record at that location has been transferred to the memory bus.

14. The microprocessor as recited in claim 11, wherein the control bits include a store conditional bit and a store conditional pass bit, such that if the store conditional bit associated with any write buffer location is active, then the data record at that location will only be transferred to the memory bus if the corresponding store conditional pass bit is also active.

15. The microprocessor as recited in claim 11, further comprising a data cache, wherein the write buffer receives an entire cache line from the data cache before transferring any of the data records contained in the cache line to the memory bus.

16. The microprocessor as recited in claim 11, wherein the input and output pointers are prevented from incrementing, thereby scaling the length of the write buffer to just one location.

* * * * *